United States Patent
Inaba et al.

(10) Patent No.: US 8,915,403 B2
(45) Date of Patent: Dec. 23, 2014

(54) FIXED-AMOUNT DISCHARGE SQUEEZE CONTAINER

(75) Inventors: Shinichi Inaba, Tokyo (JP); Susumu Fujinami, Tokyo (JP); Hiroshi Goto, Tokyo (JP)

(73) Assignee: Kao Corporation, Tokyo (JP)

(*) Notice: Subject to any disclaimer, the term of this patent is extended or adjusted under 35 U.S.C. 154(b) by 80 days.

(21) Appl. No.: 13/515,084

(22) PCT Filed: Dec. 2, 2010

(86) PCT No.: PCT/JP2010/071573
§ 371 (c)(1),
(2), (4) Date: Aug. 2, 2012

(87) PCT Pub. No.: WO2011/070965
PCT Pub. Date: Jun. 16, 2011

(65) Prior Publication Data
US 2012/0285995 A1 Nov. 15, 2012

(30) Foreign Application Priority Data
Dec. 9, 2009 (JP) ................. 2009-279285

(51) Int. Cl.
| | | |
|---|---|---|
| B65D 37/00 | (2006.01) | |
| G01F 11/08 | (2006.01) | |
| B65D 1/32 | (2006.01) | |
| B65D 1/02 | (2006.01) | |

(52) U.S. Cl.
CPC ............... B65D 1/32 (2013.01); G01F 11/082 (2013.01); *B65D 2501/0036* (2013.01); *B65D 2501/0081* (2013.01); *B65D 1/0223* (2013.01)
USPC ....................................................... 222/215

(58) Field of Classification Search
USPC .................... 222/206–215, 92, 107
See application file for complete search history.

(56) References Cited

U.S. PATENT DOCUMENTS

| | | | | |
|---|---|---|---|---|
| 2,718,987 A | * | 9/1955 | Kimball | ........................ 222/633 |
| 3,232,495 A | | 2/1966 | Schneider | |

(Continued)

FOREIGN PATENT DOCUMENTS

| | | |
|---|---|---|
| CN | 101175672 A | 5/2008 |
| EP | 2 502 851 A1 | 9/2012 |

(Continued)

OTHER PUBLICATIONS

U.S. Appl. No. 13/510,812, filed May 18, 2012, Inaba et al.

(Continued)

*Primary Examiner* — Paul R Durand
*Assistant Examiner* — Donnell Long
(74) *Attorney, Agent, or Firm* — Oblon, Spivak, McClelland, Maier & Neustadt, L.L.P.

(57) ABSTRACT

A fixed-amount discharge squeeze container (10) which discharges a specific amount of content liquid from a discharge port by squeeze deformation of a container body (11) includes a squeeze-deformable plastic-made container body (11) and a squeeze operating portion (14) to perform squeeze operation is arranged at a barrel portion (13) of the container body (11). The squeeze operating portion (14) has a cross-sectional shape formed with a compression face portion (16) having a mountain-like section including a pair of inclined face portions (15) arranged along two faces intersecting obtusely and a compression support portion (18) having an arc-shaped section which is jointed integrally with foot parts (19b) of the compression face portion (16) respectively via an edge line portion (17). The compression face portion (16) is restricted so as not to be flipped into a valley-like shape after the inclined face portions (15) deforms until force to expand the distance between the bilateral foot parts (19b) vanishes.

15 Claims, 11 Drawing Sheets

(56) References Cited

U.S. PATENT DOCUMENTS

| | | | | |
|---|---|---|---|---|
| 3,874,562 A * | 4/1975 | Hazard | ................ | 222/209 |
| 5,337,924 A * | 8/1994 | Dickie | ................ | 222/212 |
| 5,358,148 A * | 10/1994 | Hanifl et al. | ................ | 222/215 |
| 6,006,952 A * | 12/1999 | Lucas | ................ | 222/211 |
| 6,302,303 B1 * | 10/2001 | Reynolds | ................ | 222/175 |
| 7,699,183 B2 * | 4/2010 | Matsuoka et al. | ................ | 215/383 |
| 8,087,525 B2 * | 1/2012 | Kelley et al. | ................ | 215/379 |
| 8,573,434 B2 * | 11/2013 | Bezek | ................ | 220/675 |
| 2008/0232896 A1 | 9/2008 | Gibson et al. | | |
| 2008/0257856 A1 * | 10/2008 | Melrose et al. | ................ | 215/381 |
| 2009/0071979 A1 * | 3/2009 | Sharp et al. | ................ | 222/107 |
| 2009/0095774 A1 * | 4/2009 | Domoy | ................ | 222/146.5 |
| 2009/0095775 A1 * | 4/2009 | Domoy et al. | ................ | 222/212 |

FOREIGN PATENT DOCUMENTS

| | | |
|---|---|---|
| FR | 2 231 571 | 12/1974 |
| JP | 54 180057 | 12/1979 |
| JP | 59 13418 | 1/1984 |
| JP | 10 24950 | 1/1998 |
| JP | 10-24950 A | 1/1998 |
| JP | 3061042 | 9/1999 |
| JP | 3061042 U | 9/1999 |
| JP | 4074227 B2 | 4/2008 |
| NL | 6402477 | 9/1964 |

OTHER PUBLICATIONS

International Search Report Issued Feb. 15, 2011 in PCT/JP10/71573 Filed Dec. 2, 2010.

Extended Search Report issued Mar. 18, 2013 in European Application No. 10835886.2.

* cited by examiner

FIXED-AMOUNT DISCHARGE SQUEEZE CONTAINER

TECHNICAL FIELD

The present invention relates to a fixed-amount discharge squeeze container, and in particular, relates to a fixed-amount discharge squeeze container to discharge content liquid from a discharge opening with squeeze deformation of a container body.

BACKGROUND ART

A squeeze container discharges a specific amount of content liquid from a discharge opening toward a discharge position owing to squeeze deformation of a container body by being squeezed (i.e., compressed) as a barrel portion of the plastic-made squeeze-deformable container body being held with a hand, for example. There has been developed a so-called fixed-amount discharge squeeze container devised to discharge a constant amount or approximately a constant amount of content liquid each time squeeze operation is repeated without variation of a deformation amount of the container occurring when the barrel portion of the container body is squeezed (see Patent Literatures 1 and 2, for example).

A fixed-amount discharge squeeze container of Patent Literature 1 is provided with an abutment member inside a container body to restrict a depression amount of the container body. A squeeze deformation amount of the container body is restricted within a specific range by abutting a depressing operating portion to the abutment member when squeeze deformation of the container body is performed, so that a constant amount of content liquid is discharged each time. Meanwhile, in a fixed-amount discharge squeeze container of Patent Literature 2, a cylindrical cover body covers an outer peripheral wall of a container body and a bridge portion capable of being flipped toward the outer peripheral wall of the container body is formed at the cylindrical cover body. A constant amount of content liquid is discharged each time as the outer peripheral wall of the container body deforms by a specific amount with squeeze deformation by flipping of the bridge portion.

CITATION LIST

Patent Literature

Patent Literature 1: JP 10-24950 A
Patent Literature 2: Japanese Patent No. 4074227

SUMMARY OF INVENTION

The present invention provides a fixed-amount discharge squeeze container including a plastic-made squeeze-deformable container body to discharge a specific quantity of content liquid from a discharge opening with squeeze deformation of the container body, wherein the squeeze operating portion to perform squeeze operation is arranged at least at one part of the container body. The squeeze operating portion has a cross-sectional shape formed with a compression face portion having a mountain-like section including a pair of inclined face portions arranged along two faces intersecting obtusely and a compression support portion having an arc-shaped section or a U-shaped section which is jointed integrally with foot parts of the mountain-like section of the compression face portion respectively via an edge line portion. When a predetermined position of the top part of the mountain-like section of the compression face portion is compressed as being pressed with a finger, the pair of inclined face portions expand distance between the bilateral foot parts of the mountain-like section at the edge line portions against the compression support portion having the arc-shaped section or U-shaped section as the pair of inclined face portions being deformed to expand the intersecting angle therebetween. After the inclined face portions deforms until the expansion force vanishes, the compression face portion is restricted so as not to be flipped into a valley-like shape. Thus, variation of a squeeze deformation amount of the container body does not occur during repeated squeeze operations performed by pressing the predetermined position with a finger.

DESCRIPTION OF EMBODIMENTS

Figure 1:
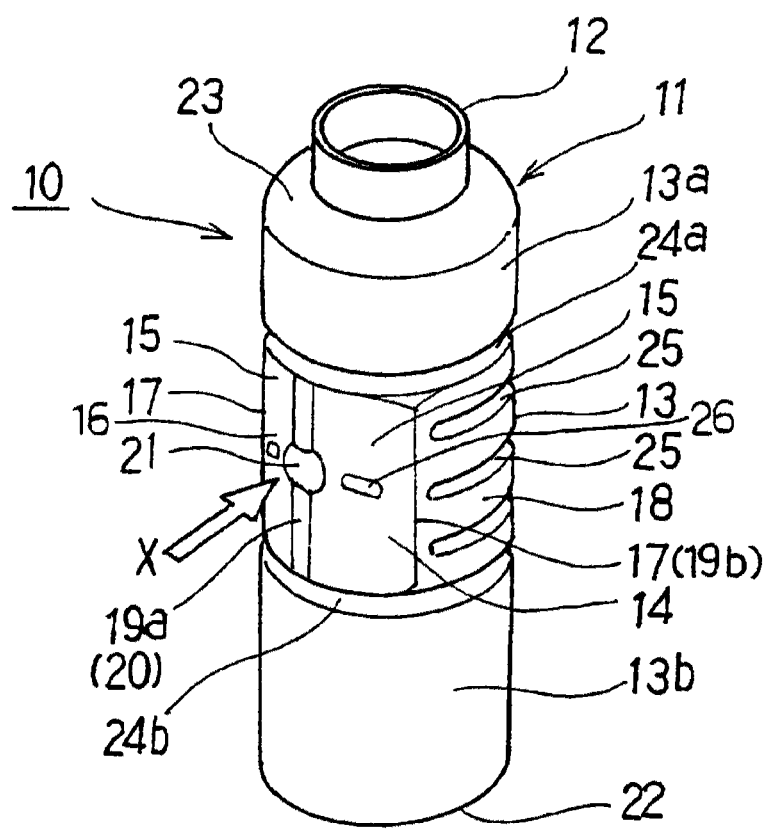
FIG. 1 is a perspective view of a container body of a fixed-amount discharge squeeze container according to a first embodiment preferable for the present invention.
Figure 2A:
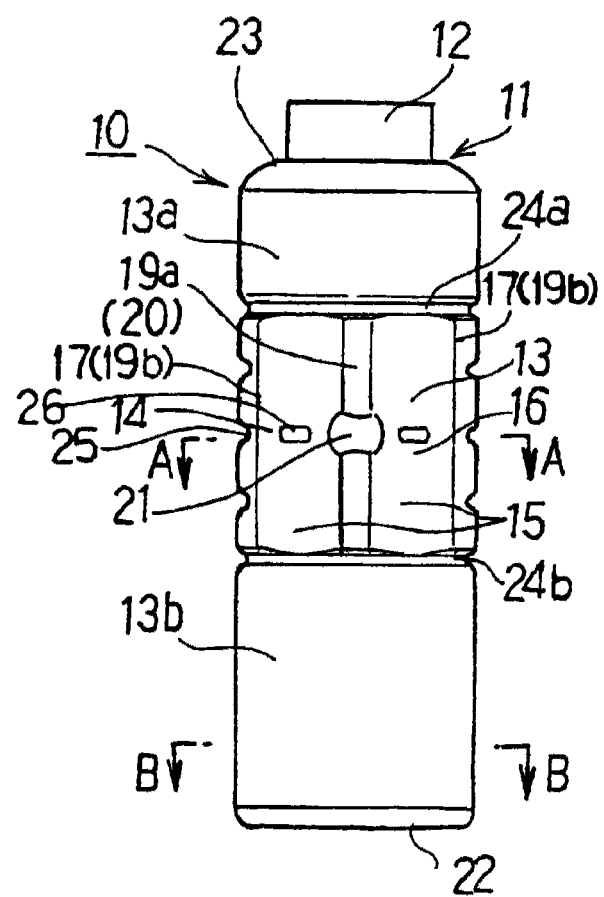
FIG. 2(a) is a front view of the container body of the fixed-amount discharge squeeze container according to the first embodiment preferable for the present invention.
Figure 2B:
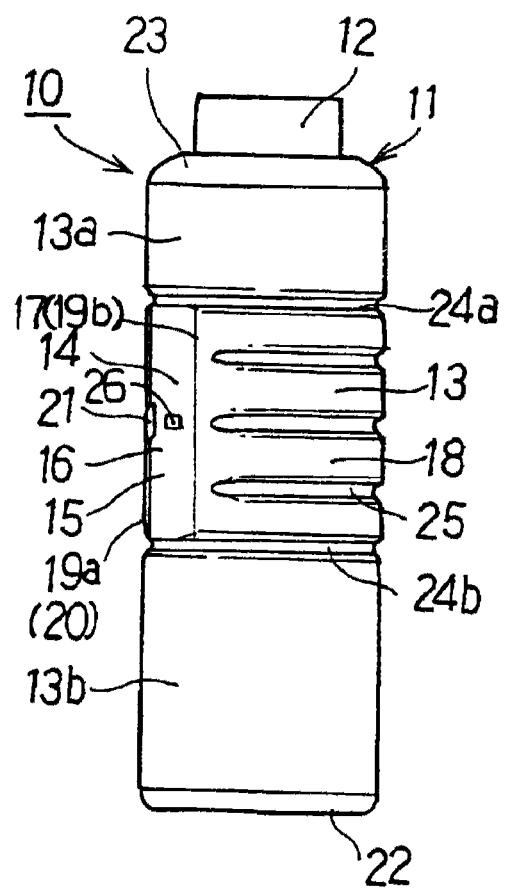
FIG. 2(b) is a side view of the container body of the fixed-amount discharge squeeze container according to the first embodiment preferable for the present invention.
Figure 2C:
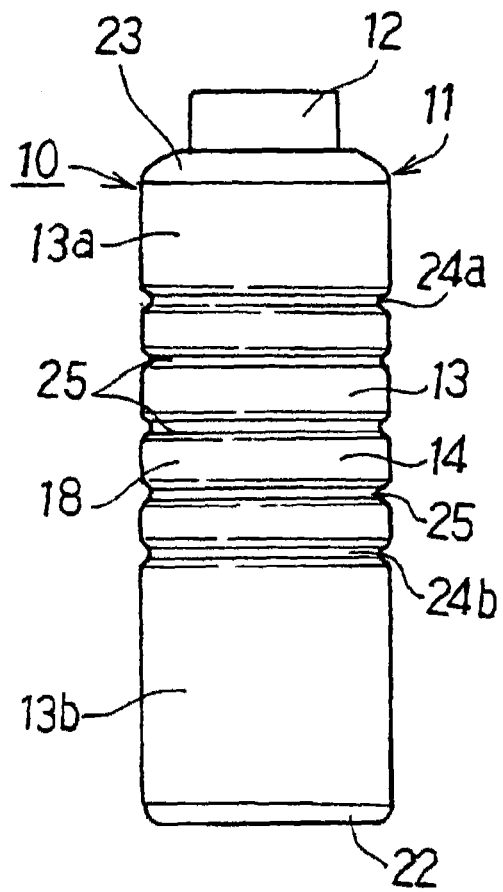
FIG. 2(c) is a back view of the container body of the fixed-amount discharge squeeze container according to the first embodiment preferable for the present invention.
Figure 3A:
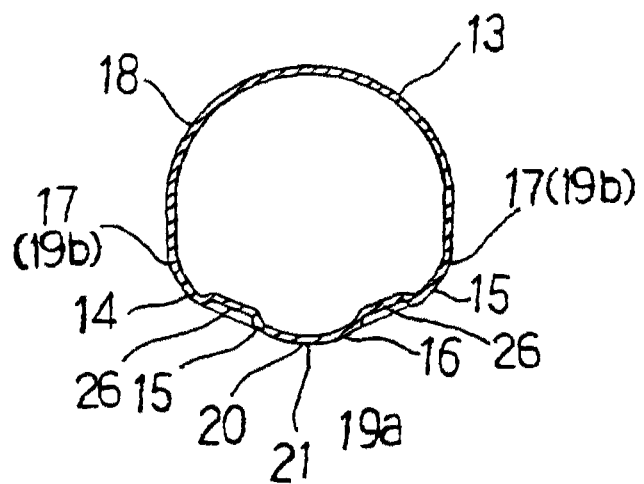
FIG. 3(a) is an end view along A-A of FIG. 2(a).
Figure 3B:
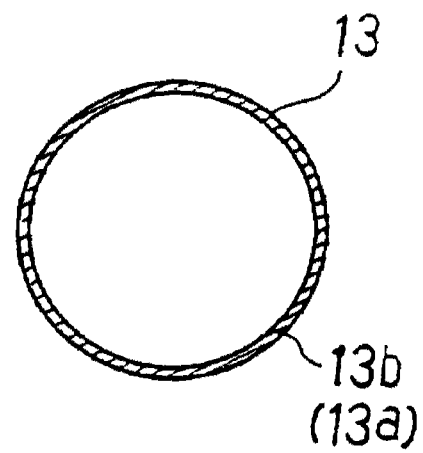
FIG. 3(b) is an end view along B-B of FIG. 2(a).

The traditional fixed-amount discharge squeeze container described above is required to attach the abutment member to the inside of the container body or to attach the cylindrical cover member at which a bridge portion is formed covering the outer peripheral wall of the container body. Therefore, the structure becomes complicated and the cost of manufacturing increases. Accordingly, development of new technology has been desired which enables to discharge a constant amount of content liquid each time by restricting a squeeze deformation amount of the container body to prevent occurrence of variation during repeated squeeze operations by devising the shape of the container body without using the abutment member or the cylindrical cover member.

The present invention relates to a fixed-amount discharge squeeze container which enables to discharge a constant amount of content liquid each time by restricting the squeeze deformation amount of the container body to prevent occurrence of variation during repeated squeeze operations by devising the shape of the container body.

The present invention provides a fixed-amount discharge squeeze container including a plastic-made squeeze-deformable container body to discharge a specific quantity of content liquid from a discharge opening with squeeze deformation of the container body, wherein the squeeze operating portion to perform squeeze operation is arranged at least at one part of the container body. The squeeze operating portion has a cross-sectional shape formed with a compression face portion having a mountain-like section including a pair of inclined face portions arranged along two faces intersecting obtusely and a compression support portion having an arc-shaped section or a U-shaped section which is jointed integrally with foot parts of the mountain-like section of the compression face portion respectively via an edge line portion. When a predetermined position of the top part of the mountain-like section of the compression face portion is compressed as being pressed with a finger, the pair of inclined face portions expand distance between the bilateral foot parts of the mountain-like section at the edge line portions against the compression support portion having the arc-shaped section or U-shaped section as the pair of inclined face portions being deformed to expand the intersecting angle therebetween. After the inclined face portions deforms until the expansion force vanishes, the compression face portion is restricted so as not to be flipped into a valley-like shape. Thus, variation of the squeeze deformation amount of the container body does not occur during repeated squeeze operations performed by pressing the predetermined position with a finger.

Hereinbelow, the present invention will be described in detail with reference to the drawings. A fixed-amount discharge squeeze container 10 according to the first embodiment preferable for the present invention as illustrated in FIGS. 1 to 3(a) and 3(b) includes a plastic-made squeeze-deformable container body 11 and a cap member (not illustrated) attached to a mouth neck portion 12 of the container body 11 in a detachably attachable manner. The squeeze container 10 can accommodate liquid cleaner for clothing, fabric softener liquid, bleacher, dish liquid, or bath additive for example as a content liquid. The squeeze container 10 can discharge a specific amount of content liquid from a discharge opening arranged at the cap member, for example, toward a discharge position by deforming the container body 11 by squeezing (compressing), to a squeeze direction X, a barrel portion 13 of the container body 11 which is held in a tilted or inverted state. The squeeze container 10 has a function to discharge a constant amount of the content liquid each time by restricting the squeeze deformation amount of the container body 11 to prevent occurrence of variation during repeated squeeze operations performed by compressing a predetermined position of the barrel portion 13 with a finger, for example, by devising only the shape of the container body 11.

That is, the fixed-amount discharge squeeze container 10 according to the first embodiment is a squeeze container which includes a plastic-made squeeze-deformable container body 11 and which discharges the specific amount of content liquid from the discharge opening with squeeze deformation of the container body 11. As illustrated in FIGS. 1 and 2(a) to 2(c), the container body 11 is arranged with a squeeze operating portion 14 to perform squeeze operation at least at one part of the barrel portion 13. The squeeze operating portion 14 has a cross-sectional shape formed with a compression face portion 16 having a mountain-like section including a pair of inclined face portions 15 arranged along two faces intersecting obtusely and a compression support portion 18 having an arc-shaped section which is jointed integrally with foot parts 19b of the mountain-like section of the compression face portion 16 respectively via an edge line portion 17.

Figure 4A:
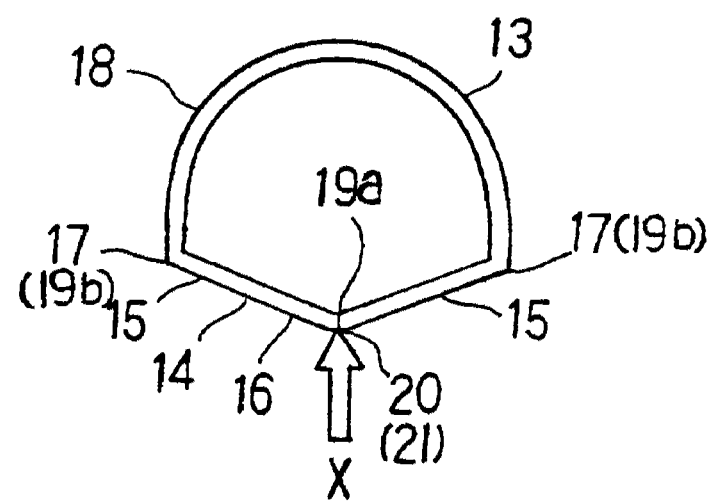
FIG. 4(a) is an explanatory schematic sectional view illustrating a state of restricting a squeeze deformation amount of the container body at the time of squeeze operation of the fixed-amount discharge squeeze container according to the first embodiment preferable for the present invention.

When a predetermined position of the top part 19a of the mountain-like section of the compression face portion 16 is compressed to the squeeze direction X as being pressed with a finger (see FIG. 4(a)), the pair of inclined face portions 15 expand distance between the bilateral foot parts 19b of the mountain like section at the edge line portions 17 against the compression support portion 18 having the arc-shaped section as the pair of inclined face portions 15 being deformed to expand the intersecting angle therebetween. After the inclined face portions 15 deforms until the expansion force to expand distance between the bilateral foot parts 19b vanishes (see FIG. 4(b)), the compression face portion 16 is restricted so as not to be flipped into a valley-like shape. Thus, variation of the squeeze deformation amount of the container body 11 does not occur during repeated squeeze operations performed by pressing the predetermined position with a finger and the constant amount of the content liquid can be discharged each time.

Further, in the first embodiment, the top part 19a of the mountain-like section of the compression face portion 16 of the squeeze operating portion 14 is to be a squeeze edge line portion 20 where the pair of inclined face portions 15 is jointed.

In the first embodiment, the container body 11 is made of various types of synthetic resin well known as being suitable for forming squeeze-deformable plastic container such as polyethylene terephthalate, polypropylene, high density polyethylene, and polyvinyl chloride, for example. The container body 11 is formed by blow molding, for example, into a hollow bottle shape including the bottom portion 22, the barrel portion 13, the shoulder portion 23, and the mouth neck portion 12. The container body 11 is formed such that the shoulder portion 23 and the mouth neck portion 12 at the upper end part and the bottom portion 22 at the lower end part are thicker than the barrel portion 13 and that the shoulder portion 23 and the bottom portion 22 are formed as being approximately circular in a plane view. Accordingly, each circular sectional shape at the top end part of an upper barrel portion 13a and the bottom end part of a lower barrel portion 13b (see FIG. 3(b)) is strongly and stably maintained.

In the first embodiment, the barrel portion 13 sandwiched between the shoulder portion 23 and the bottom portion 22 is formed to include the squeeze operating portion 14, the upper barrel portion 13a which continues to the upper side of the squeeze operating portion 14 and which has a different sectional shape from that of the squeeze operating portion 14, and the lower barrel portion 13b which continues to the lower side of the squeeze operating portion 14 and which has a different sectional shape from that of the squeeze operating portion 14. The barrel portion 13 is formed thinner than the shoulder portion 23 and the bottom portion 22 and the compression face portion 16 of the squeeze operating portion 14 is structured to have flexibility as being easily squeeze-deformable with force of a hand or a finger holding the barrel portion 13, as described below.

In the first embodiment, the squeeze operating portion 14 is comparted from the upper barrel portion 13a with the circular section at the upper side and the lower barrel portion 13b with the circular section at the lower side with upper and lower circular boundary ribs 24a, 24b arranged extending in a circumferential direction of the barrel portion 13. The squeeze operating portion 14 has a shape integrally formed with the compression face portion 16 having a mountain-like section and a compression support portion 18 having an arc-shaped section via the edge line portions 17 (see FIG. 3(a)).

The compression face portion 16 includes the pair of inclined face portions 15 arranged along two faces intersecting obtusely and the squeeze edge line portion 20 extended vertically is formed at a joint part of the intersecting inclined face portions 15 as the top part 19a of the mountain-like section arranged at the center part of the compression face portion 16. In the first embodiment, the squeeze edge line portion 20 is arranged as a curved face curved smoothly and a squeeze position guide portion 21 to guide a predetermined position to be pressed with a finger to perform squeeze operation is arranged as a convex portion having a step between the squeeze edge line portion 20 at the center part thereof in the vertical direction. The foot part 19b which is at the opposite side of the pair of inclined face portions 15 against the squeeze edge line portion 20 is jointed with the compression support portion 18 via the edge line portions 17 extended vertically in parallel with the squeeze edge line portion 20.

The compression support portion 18 is a part arranged at the back face side of the squeeze operating portion 14 opposed to the squeeze surface portion 16 and is capable of stably supporting the compressing force applied to the compression face portion 16 at the time of squeeze operation since having certain stiffness for shape retaining. In the first embodiment, the compression support portion 18 has an arc-shaped section slightly exceeding a semicircular shape and reaction force of the squeezing force can be efficiently supported by a palm holding the barrel portion 13, for example, owing to high stiffness of the arc shape for shape retaining without causing deformation of the compression support portion 18.

Further, in the first embodiment, a plurality of stiffness reinforcement ribs 25 which improves stiffness for shape retaining of the compression support portion 18 is arranged extending in the circumferential direction at intervals in the vertical direction at the compression support portion 18 having an arc-shaped section, and reaction force occurring when compressing force is applied to the compression face portion 16 can be further efficiently supported owing to the stiffness reinforcement ribs 25.

Figure 4B:
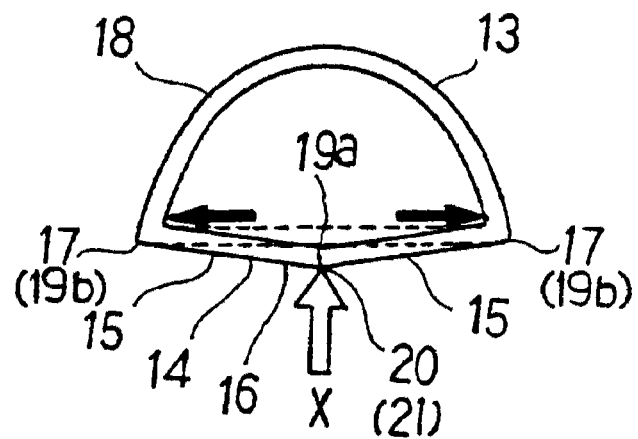
FIG. 4(b) is an explanatory schematic sectional view illustrating a state of the restricting squeeze deformation amount of the container body at the time of squeeze operation of the fixed-amount discharge squeeze container according to the first embodiment preferable for the present invention.
Figure 5:
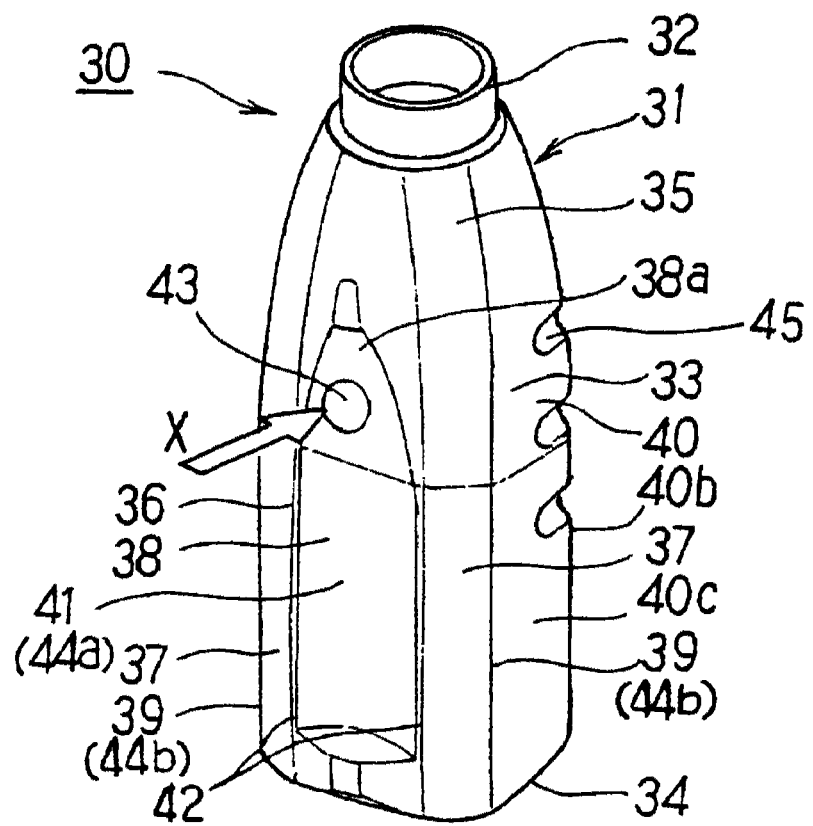
FIG. 5 is a perspective view of a container body of a fixed-amount discharge squeeze container according to a second embodiment preferable for the present invention.
Figure 6A:
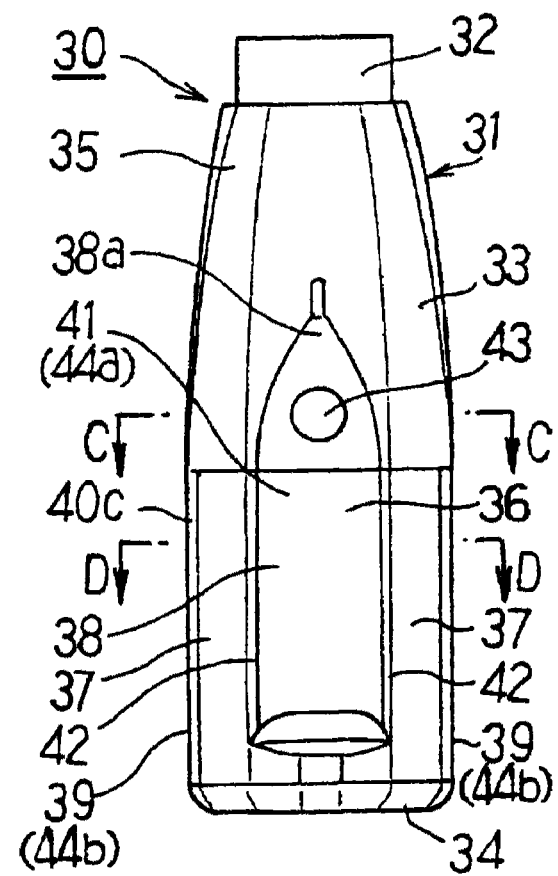
FIG. 6(a) is a front view of the container body of the fixed-amount discharge squeeze container according to the second embodiment preferable for the present invention.
Figure 6B:
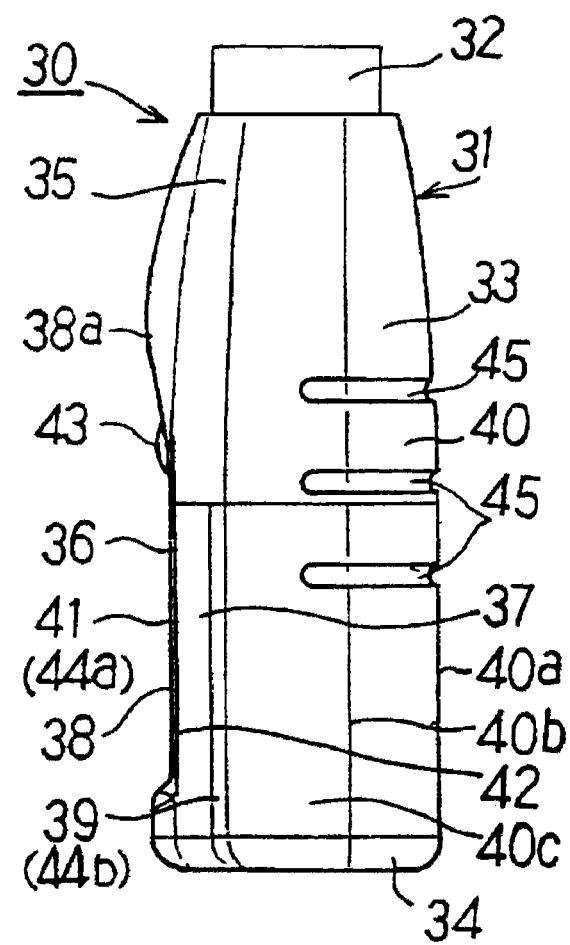
FIG. 6(b) is a side view of the container body of the fixed-amount discharge squeeze container according to the second embodiment preferable for the present invention.
Figure 6C:
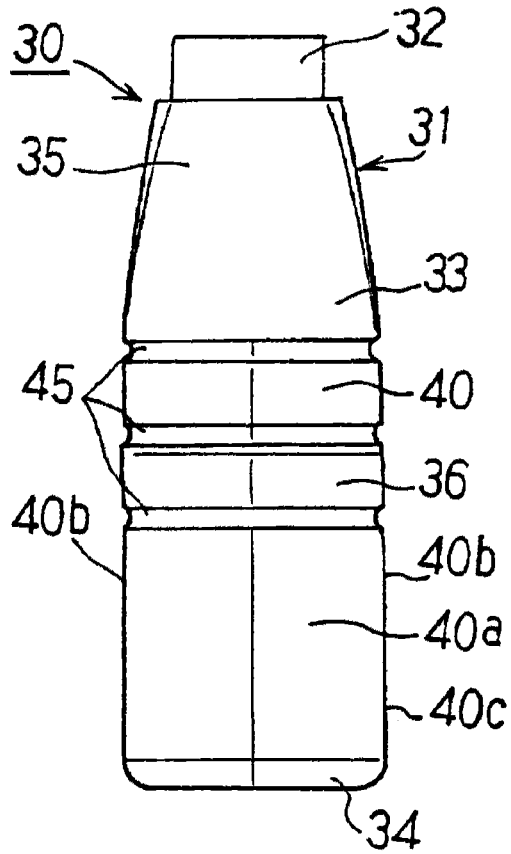
FIG. 6(c) is a back view of the container body of the fixed-amount discharge squeeze container according to the second embodiment preferable for the present invention.
Figure 7A:
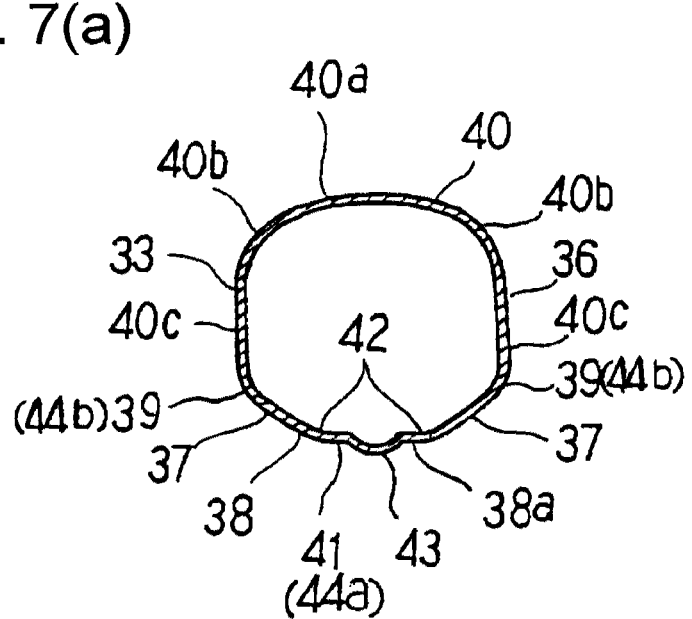
FIG. 7(a) is an end view along C-C of FIG. 6(a).
Figure 7B:
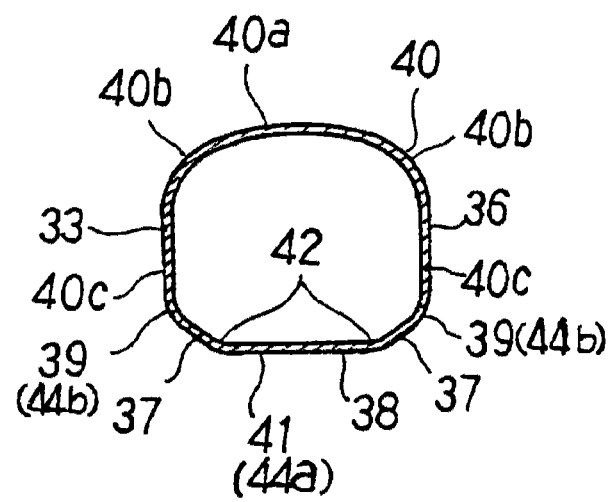
FIG. 7(b) is an end view along D-D of FIG. 6(a).

According to the fixed-amount discharge squeeze container 10 of the first embodiment having the above structure, to discharge the specific amount of content liquid by squeeze deformation of the container body 11, compressing force is to be applied to the squeeze edge line portion 20 of the squeeze surface portion 16 as being pressed the squeeze position guide portion 21 with a thumb, for example, in a state where a discharge opening is oriented toward the discharge position, after the barrel portion 13 of the container body 11 is held and the container 10 is tilted or inverted. Thus, as illustrated in FIGS. 4(a) and 4(b), parts of the pair of inclined face portions 15 adjacent to the squeeze position guide portion 21 expand distance between the edge line portions 17 of the bilateral foot parts 19b which are the joint parts with the compression support portion 18 as deforming to expand the intersecting angle therebetween while the part of the squeeze edge line portion 20 adjacent to the squeeze position guide portion 21 is pressed into the squeeze direction X as the compression support portion 18 supports the compressing force. Accordingly, the mountain shape section of the compression face portion 16 is flattened out to be flat and the volume of the container body 11 decreases. Therefore, content liquid can be discharged owing to the volume decrease.

In the first embodiment, when the parts of the pair of inclined face portions 15 adjacent to the squeeze position guide portion 21 are deformed until being linearly continued sandwiching the squeeze edge line portion 20 (see broken lines of FIG. 4(b)), the pair of inclined face portions 15 cannot expand distance between the edge line portions 17 anymore as the mountain-like section of the compression face portion 16 becomes fully-stretched being approximately flat. Even if the squeeze edge line portion 20 of the compression face portion 16 is to be further pressed into the squeeze direction X from the above state to flip the pair of inclined face portions 15 to the squeeze direction X side, parts of the inclined face portions 15 being apart from the squeeze position guide portion 21 to which compressing force is applied are not deformed until the pair of inclined face portions 15 become linear. Thus, the parts of the pair of inclined face portions 15 adjacent to the squeeze position guide portion 21 to which a finger is pressed are restricted from being flipped in the squeeze direction X side owing to action of the mountain-like section at parts of the inclined face portions 15 apart from the squeeze position guide portion 21. Accordingly, when compressing force is applied to the squeeze position guide portion 21 with a thumb pressing thereto, for example, squeeze deformation of the container body 11 is performed with the constant deformation amount at any time. That is, discharging of the constant amount can be easily performed with the predetermined amount of content liquid since variation of the squeeze deformation amount of the container body 11 does not occur during repeated squeeze operations.

According to the fixed-amount discharge squeeze container 10 of the first embodiment, the constant amount of content liquid can be discharged by restricting the squeeze deformation amount of the container body 11 so that variation does not occur during repeated squeeze operations by devising only the shape of the container body 11.

According to the fixed-amount discharge squeeze container 10 of the first embodiment, deformation does not occur at the parts expect for the squeeze operating portion 14 of the barrel portion 13 (i.e., upper barrel portion 13a and lower barrel portion 13b) since circular boundary ribs 24a, 24b are arranged. Therefore, in the barrel portion 13, the upper barrel portion 13a and lower barrel portion 13b can freely adopt the shape with different sectional shape from that of the squeeze operating portion 14. In the first embodiment, although the upper barrel portion 13a and lower barrel portion 13b is arranged at the upper and lower side of the squeeze operating portion 14 respectively, these may not be arranged. Further, adjustment of the discharge amount is not affected by the existence or non-existence of the upper barrel portion 13a and the lower barrel portion 13b.

In the first embodiment, squeeze deformation induction ribs 26 are arranged at both sides of the pair of inclined face portions 15 sandwiching the squeeze edge line portion 20. The squeeze deformation induction rib 26 is formed as lateral ribs orthogonal against the squeeze edge line portion 20 at approximately center of the pair of each inclined face portions 15 in the vicinity of the squeeze edge line portion 20. That is, the pair of squeeze deformation induction ribs 26 is arranged on an approximately straight line striding across the squeeze edge line portion 20. Since the pair of squeeze deformation induction ribs 26 is arranged orthogonal against the squeeze edge line portion 20, the pair of inclined face portions 15 deform in a stable shape at any time and, thus, variation of the discharge amount is reduced and stabilizing effect is obtained. Further, an effect to enhance a constant deformation touch (i.e., clicking sense) which a user feels at the time of pressing is obtained.

In the present embodiment, a desired discharge amount can be obtained by appropriately designing distance between the circular boundary ribs 24a, 24b (i.e., the length of the squeeze operating portion 14 in the axial direction of the container body 11), distance between the bilateral edge line portions 17 (i.e., the length of the compression face portion 16 in the width direction of the container body 11), an angle to form the top part 19 of the mountain-like section of the pair of inclined face portions 15, and the like.

FIGS. 5 to 7(a) and 7(b) illustrate a container body 31 of the fixed-amount discharge squeeze container 30 according to the second embodiment preferable for the present invention. The container body 31 according to the second embodiment is formed into a hollow bottle shape including a barrel portion 33, a bottom portion 34, a shoulder portion 35, and a mouth neck portion 32 using synthetic resin, as similar to the container body 11 of the fixed-amount discharge squeeze container 10 in the first embodiment. Further, in the second embodiment, almost the whole of the thin barrel portion 33 sandwiched between the shoulder portion 35 and the bottom portion 34 which are formed thick is a squeeze operating portion 36 smoothly continued with the shoulder portion 35 and the bottom portion 34 without having a clear boundary.

In the second embodiment, the squeeze operating portion 36 has a cross-sectional shape formed with a compression face portion 38 having a mountain-like section including a pair of inclined face portions 37 arranged along two faces intersecting obtusely and a compression support portion 40 having a U-shaped section which is jointed integrally with foot parts 44b of the mountain-like section of the compression face portion 38 respectively via an edge line portion 39. Further, the top part 44a of the mountain-like section of the compression face portion 38 is a flat squeeze face portion 41 arranged between the pair of inclined face portions 37.

That is, the compression face portion 38 is formed with the pair of inclined face portions 37 arranged along the two faces intersecting obtusely and the squeeze face portion 41 arranged between them, and the pair of inclined face portions 37 and the squeeze face portion 41 is continued integrally via a marginal edge line portion 42. In the second embodiment, a raised portion 38a which is raised smoothly toward the outside is formed at the upper end part of the compression face portion 38. The pair of marginal edge line portions 42 at both sides of the squeeze face portion 41 has the mutual distance gradually narrowed toward the front edge part of the raised portion 38a at the upper part of the squeeze face portion 41. Further, in the second embodiment, a squeeze position guide portion 43 to guide a predetermined position to be pressed with a finger to perform squeeze operation is arranged as a convex portion having a step between the squeeze face portion 41 at the center part of a base end starting part of the raising portion 38a in the width direction at the upper part of the squeeze face portion 41.

In the second embodiment, the compression support portion 40 has a U-shaped section. That is, the compression support portion 40 has an approximate U-shaped sectional shape as a whole formed with an arc-shaped part 40a arranged at a rear face side of the squeeze operating portion 36 opposed to the compression face portion 38 and a pair of side face support wall portions 40c which is arranged along a direction parallel or approximately parallel to a squeeze direction X and which is jointed to both sides of the arc-shaped part 40a via a curved joint part 40b. In the second embodiment, since the compression support portion 40 has a sectional shape having high stiffness for shape retaining which is integrally formed with an arc-shaped section 40a which is arc-shaped and a pair of side face support portions 40c along the squeeze direction X, reaction force of the squeezing force can be efficiently supported by a palm holding the barrel portion 33, for example, without deforming the compression support portion 40.

In the second embodiment, a plurality of stiffness reinforcement ribs 45 which improves stiffness for shape retaining of the compression support portion 40 is arranged extending in the circumferential direction at intervals in the vertical direction from the arc-shaped section 40a of the compression support portion 40 to the both sides of side face support portions 40c and, accordingly, reaction force of the squeezing force occurring when compressing force is applied to the compression face portion 38 can be further efficiently supported.

Figure 8A:
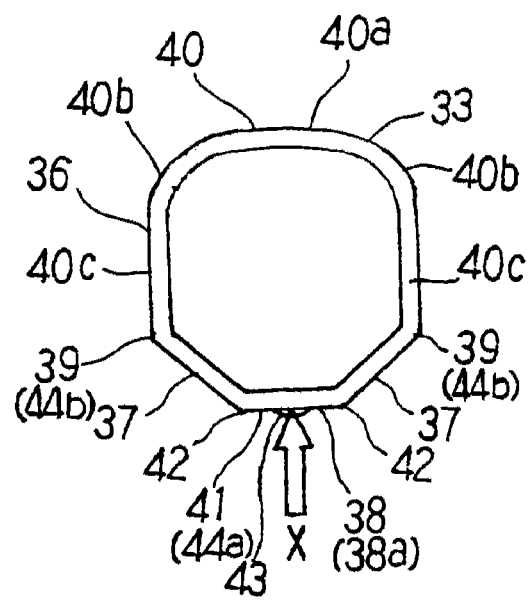
FIG. 8(a) is an explanatory schematic sectional view illustrating, along C-C of FIG. 6(a), a state of restricting a squeeze deformation amount of the container body at the time of squeeze operation of the fixed-amount discharge squeeze container according to the second embodiment preferable for the present invention.

According to the fixed-amount discharge squeeze container 30 of the second embodiment having the above structure, compressing force is applied to the squeeze face portion 41 as the squeeze position guide portion 43 being pressed with a thumb, for example, in a state where a discharge opening is oriented toward the discharge position and the barrel portion 33 of the container body 31 is held (see FIG. 8(a)). Thus, parts of the pair of squeeze face portions 41 adjacent to the squeeze position guide portion 43 expand distance between the edge line portions 39 of the bilateral foot parts 44b which are the joint parts with the compression support portion 40 as being deformed to expand the intersecting angle therebetween while the part of pair of inclined face portions 37 adjacent to the squeeze position guide portion 43 is pressed into the squeeze direction X as the compression support portion 40 supports the compressing force. Accordingly, the mountain shape section of the compression face portion 38 is flattened out to be flat (see FIG. 8(b)) and the volume of the container body 11 decreases. Therefore, content liquid can be discharged owing to the volume decrease.

Figure 8B:
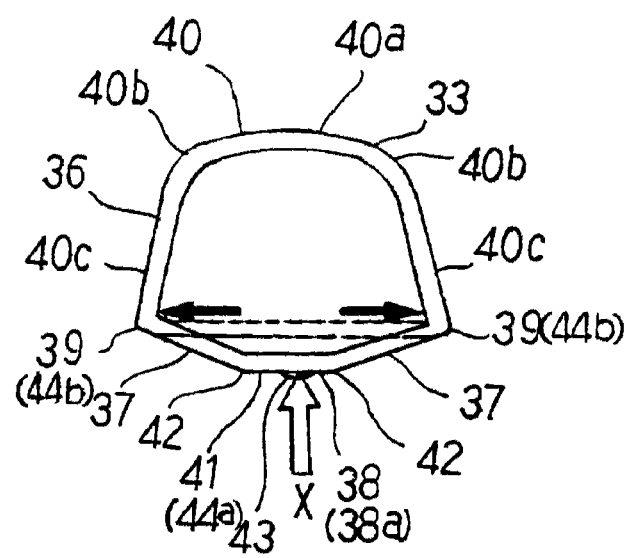
FIG. 8(b) is an explanatory schematic sectional view illustrating, along C-C of FIG. 6(a), a state of the restricting squeeze deformation amount of the container body at the time of squeeze operation of the fixed-amount discharge squeeze container according to the second embodiment preferable for the present invention.

When the parts of the pair of inclined face portions 37 adjacent to the squeeze position guide portion 43 are deformed until being linear sandwiching the squeeze face portion 41 (see broken lines of FIG. 8(b)), the pair of inclined face portions 37 cannot expand distance between the edge line portions 39 anymore as the mountain-like section of the compression face portion 38 becomes fully-stretched being approximately flat. Even if the squeeze face portion 41 is to be further pressed into the squeeze direction X from the above state to flip the pair of inclined face portions 37 to the squeeze direction X side, parts of the pair of the inclined face portions 37 being apart from the squeeze position guide portion 43 to which compressing force is applied are not deformed until the pair of inclined face portions 37 become linear. Thus, the parts of the pair of inclined face portions 37 adjacent to the squeeze position guide portion 43 are restricted from being flipped in the squeeze direction X side owing to action of the mountain-like section at parts of the inclined face portions 37 apart from the squeeze position guide portion 21. Accordingly, when compressing force is applied to the squeeze position guide portion 43 with a thumb pressing thereto, for example, squeeze deformation of the container body 31 is performed with a constant deformation amount at any time, and similar operational effects to the fixed-amount discharge squeeze container 10 of the first embodiment can be obtained in the fixed-amount discharge squeeze container 30 of the second embodiment.

Here, not limited to the above embodiments, the present invention may be modified variously. For example, it is also possible that a squeeze position guide portion which is arranged at a top part of a compression face portion having a mountain-like section may be arranged by indicating a position to perform squeeze operation with a finger by being concaved, having a container surface roughened by partially modifying roughness of a mold surface, label printing, and the like. Further, a squeeze edge line portion may be arranged as being flat-shaped instead of being a curved face. Further, the position to arrange the squeeze position guide portion and to perform squeeze operation may be at an arbitrary position around a top part of the compress face portion instead of a center part of the top part of the compression face portion in order to perform squeeze operation. Further, the discharge amount of the content liquid to be discharged in constant amount may be adjusted by arranging a plurality of squeeze position guide portions and selecting a compressing position.

INDUSTRIAL APPLICABILITY

According to the fixed-amount discharge squeeze container of the present invention, the constant amount of content liquid can be discharged by restricting the squeeze deformation amount of the container body to prevent occurrence of variation during repeated squeeze operations by devising only the shape of the container body.

The invention claimed is:

1. A fixed-amount discharge squeeze container, comprising:
   a plastic squeeze-deformable container body to discharge a specific quantity of liquid from a discharge opening with squeeze deformation of the container body; and
   a squeeze operating portion arranged at least at one part of the container body, wherein
   the squeeze operating portion has a cross-sectional shape formed with a compression face portion having a mountain-like section comprising a pair of inclined face portions present along two faces intersecting obtusely and a compression support portion having an arc-shaped section or a U-shaped section that is jointed integrally with foot parts of the mountain-like section of the compression face portion respectively via an edge line portion;
   the pair of inclined face portions expand a distance between the bilateral foot parts of the mountain-like section at the edge line portions against the compression support portion having the arc-shaped section or U-shaped section when the pair of inclined face portions are deformed to expand the intersecting angle therebetween when a predetermined position of the top part of the mountain-like section of the compression face portion is compressed, while the compression face portion is restricted so as not to be flipped into a valley-like shape after the inclined face portions deforms until an expansion force vanishes, so as to prevent occurrence of variation in a squeeze deformation amount of the container body during repeated squeeze operations performed by pressing the predetermined position; and
   the inclined face portions are discontinuous surfaces and, in an un-deformed state, are flat in at least a lateral direction of the container.

2. The fixed-amount discharge squeeze container according to claim 1, wherein the top part of the mountain-like section of the compression face portion is a squeeze edge line portion where the pair of inclined face portions is jointed.

3. The fixed-amount discharge squeeze container according to claim 2, wherein squeeze deformation induction ribs are formed as lateral ribs orthogonal against the squeeze edge line portion and arranged at both sides of the pair of inclined face portions sandwiching the squeeze edge line portion.

4. The fixed-amount discharge squeeze container according to claim 1, wherein the container body comprises an upper barrel portion which continues to the upper side of the squeeze operating portion and which has a different sectional shape from that of the squeeze operating portion and an lower barrel portion which continues to the lower side of the squeeze operating portion and which has a different sectional shape from that of the squeeze operating portion.

5. The fixed-amount discharge squeeze container according to claim 2, wherein the container body comprises an upper barrel portion which continues to the upper side of the squeeze operating portion and which has a different sectional shape from that of the squeeze operating portion and an lower barrel portion which continues to the lower side of the squeeze operating portion and which has a different sectional shape from that of the squeeze operating portion.

6. The fixed-amount discharge squeeze container according to claim 1, wherein a plurality of stiffness reinforcement ribs which improves stiffness for shape retaining of the compression support portion are present in the container body extending in the circumferential direction at intervals in the vertical direction at the compression support portion having the arc-shaped section or the U-shaped section.

7. The fixed-amount discharge squeeze container according to claim 2, wherein a plurality of stiffness reinforcement ribs which improves stiffness for shape retaining of the compression support portion are present in the container body extending in the circumferential direction at intervals in the vertical direction at the compression support portion having the arc-shaped section or the U-shaped section.

8. The fixed-amount discharge squeeze container according to claim 1, wherein:
   the container body comprises an upper barrel portion which continues to the upper side of the squeeze operating portion and which has a different sectional shape from that of the squeeze operating portion and an lower barrel portion which continues to the lower side of the squeeze operating portion and which has a different sectional shape from that of the squeeze operating portion, and
   a plurality of stiffness reinforcement ribs which improves stiffness for shape retaining of the compression support portion are present in the container body extending in the circumferential direction at intervals in the vertical direction at the compression support portion having the arc-shaped section or the U-shaped section.

9. The fixed-amount discharge squeeze container according to claim 2, wherein:
   the container body comprises an upper barrel portion which continues to the upper side of the squeeze operating portion and which has a different sectional shape from that of the squeeze operating portion and an lower barrel portion which continues to the lower side of the squeeze operating portion and which has a different sectional shape from that of the squeeze operating portion, and a plurality of stiffness reinforcement ribs which improves stiffness for shape retaining of the compression support portion are present in the container body extending in the circumferential direction at intervals in the vertical direction at the compression support portion having the arc-shaped section or the U-shaped section.

10. The fixed-amount discharge squeeze container according to claim 1, wherein the squeeze operating portion comprises upper and lower circular boundary ribs arranged extending in a circumferential direction of a barrel portion of the container body.

11. A fixed-amount discharge squeeze container, comprising:
a plastic squeeze-deformable container body to discharge a specific quantity of liquid from a discharge opening with squeeze deformation of the container body; and
a squeeze operating portion arranged at least at one part of the container body, wherein
the squeeze operating portion has a cross-sectional shape formed with a compression face portion having a mountain-like section comprising a pair of inclined face portions present along two faces intersecting obtusely and a compression support portion having an arc-shaped section or a U-shaped section that is jointed integrally with foot parts of the mountain-like section of the compression face portion respectively via an edge line portion;
the pair of inclined face portions expand a distance between the bilateral foot parts of the mountain-like section at the edge line portions against the compression support portion having the arc-shaped section or U-shaped section when the pair of inclined face portions are deformed to expand the intersecting angle therebetween when a predetermined position of the top part of the mountain-like section of the compression face portion is compressed, while the compression face portion is restricted so as not to be flipped into a valley-like shape after the inclined face portions deforms until an expansion force vanishes, so as to prevent occurrence of variation in a squeeze deformation amount of the container body during repeated squeeze operations performed by pressing the predetermined position; and
the squeeze operating portion comprises one or more boundary ribs arranged extending in a circumferential direction of a barrel portion of the container body.

12. The fixed-amount discharge squeeze container according to claim 11, wherein the one or more boundary ribs include upper and lower boundary ribs arranged extending in the circumferential direction of the barrel portion of the container body.

13. The fixed-amount discharge squeeze container according to claim 12, wherein the upper and lower boundary ribs arranged extending in the circumferential direction of the barrel portion of the container body are circular.

14. The fixed-amount discharge squeeze container according to claim 11, wherein the inclined face portions are discontinuous surfaces and, in an un-deformed state, are flat in at least a lateral direction of the container.

15. A fixed-amount discharge squeeze container, comprising:
a plastic squeeze-deformable container body to discharge a specific quantity of liquid from a discharge opening with squeeze deformation of the container body; and
a squeeze operating portion arranged at least at one part of the container body, wherein
the squeeze operating portion has a cross-sectional shape formed with a compression face portion having a mountain-like section comprising a pair of inclined face portions present along two faces intersecting obtusely and a compression support portion having an arc-shaped section or a U-shaped section that is jointed integrally with foot parts of the mountain-like section of the compression face portion respectively via an edge line portion;
the pair of inclined face portions expand a distance between the bilateral foot parts of the mountain-like section at the edge line portions against the compression support portion having the arc-shaped section or U-shaped section when the pair of inclined face portions are deformed to expand the intersecting angle therebetween when a predetermined position of the top part of the mountain-like section of the compression face portion is compressed, while the compression face portion is restricted so as not to be flipped into a valley-like shape after the inclined face portions deforms until an expansion force vanishes, so as to prevent occurrence of variation in a squeeze deformation amount of the container body during repeated squeeze operations performed by pressing the predetermined position;
the top part of the mountain-like section of the compression face portion includes a squeeze edge line portion where the pair of inclined face portions is jointed; and
squeeze deformation induction ribs are formed as lateral ribs orthogonal against the squeeze edge line portion and arranged at both sides of the pair of inclined face portions sandwiching the squeeze edge line portion.

* * * * *